Figure 1:
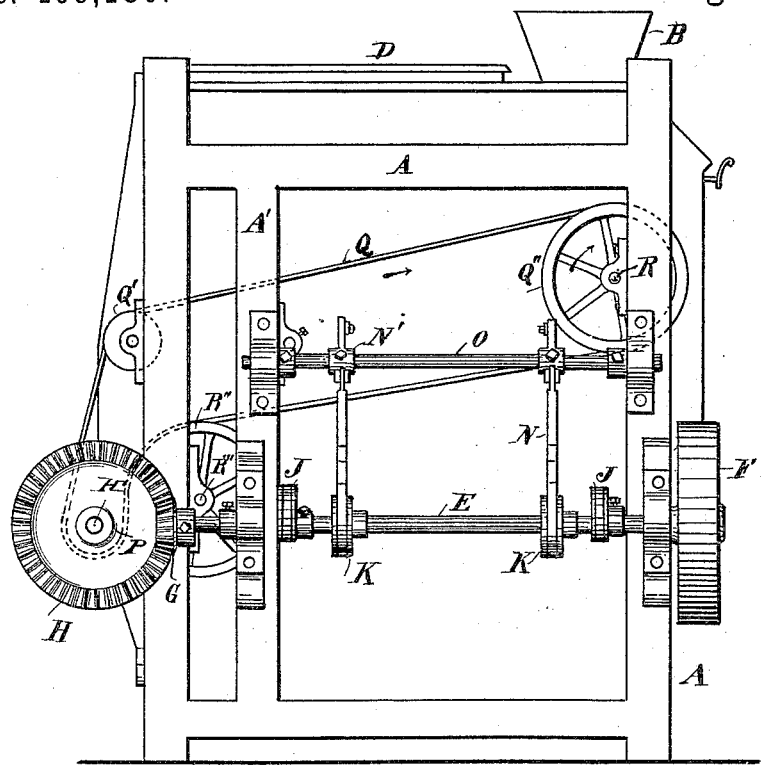

(No Model.) 3 Sheets—Sheet 1.

T. E. FERGUSON & A. H. BLANCHARD.
DEVICE FOR SEPARATING WEEVIL AND WEEVIL DUST FROM GRAIN.

No. 409,180. Patented Aug. 20, 1889.

Witnesses.
Wesley Smith
Carroll J. Webster

Inventors
Thomas E. Ferguson
Addison H. Blanchard
By Wm Webster
Atty (No Model.) 3 Sheets—Sheet 2.

T. E. FERGUSON & A. H. BLANCHARD.
DEVICE FOR SEPARATING WEEVIL AND WEEVIL DUST FROM GRAIN.

No. 409,180. Patented Aug. 20, 1889.

Witnesses.
Wesley Smith
Carroll J. Webster

Inventors
Thomas E. Ferguson
Addison H. Blanchard
By Wm Webster
Atty (No Model.) 3 Sheets—Sheet 3.

T. E. FERGUSON & A. H. BLANCHARD.
DEVICE FOR SEPARATING WEEVIL AND WEEVIL DUST FROM GRAIN.

No. 409,180. Patented Aug. 20, 1889.

Witnesses:

Inventors.
J. E. Ferguson
A. H. Blanchard
By Wm Webster
Atty

UNITED STATES PATENT OFFICE.

THOMAS EASTON FERGUSON AND ADDISON HENRY BLANCHARD, OF TOLEDO, OHIO.

DEVICE FOR SEPARATING WEEVIL AND WEEVIL-DUST FROM GRAIN.

SPECIFICATION forming part of Letters Patent No. 409,180, dated August 20, 1889.

Application filed August 9, 1887. Serial No. 246,488. (No model.)

*To all whom it may concern:*

Be it known that we, THOMAS EASTON FERGUSON and ADDISON HENRY BLANCHARD, citizens of the United States, and residents of Toledo, in the county of Lucas and State of Ohio, have invented certain new and useful Improvements in Machines for Separating Weevil and Weevil-Dust from Grain; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to a machine for separating weevil and weevil-dust from grain; and the object of our invention is to provide a machine which may be operated by the minimum amount of power, and which shall serve to effectually separate the weevil and the dust created thereby from the grain and permit the insects and dust to be readily removed from the machine and quickly destroyed, so as to effectually prevent any further damage by such insects.

It is well known by those accustomed to the care and handling of grain in bulk that the weevil in such material is one of the greatest causes of injury to which the material can be subjected, as these insects are extremely active in their operations and multiply with extraordinary rapidity. For these reasons it becomes necessary as soon as the weevil is discovered to immediately subject the grain to a thorough treatment, whereby the weevil shall be completely separated from the material, or otherwise the entire mass of material will be speedily damaged to a serious extent. Machines of this character, from the very dissimilarity of the work they have to perform, have to fulfill a requirement not imposed upon ordinary forms of grain-separators, inasmuch as they must not only operate continuously, but with greater rapidity than such ordinary separators, and permit the insects and the dust created by them to be quickly removed, so as to be speedily burned or otherwise effectually destroyed. These results have heretofore been sought to be accomplished by the use of revoluble brushes, through or between which the grain is passed. Such previous forms of apparatus are inefficient and objectionable, because a large proportion of grain is thrown out with the matter sought to be separated. Machines using the fan-blast have also been employed for this purpose, but are also objectionable, because a current of air sufficient to dislodge the weevil is of such force as to carry with it a large amount of grain, thus rendering such apparatus too wasteful for practical purposes. Both of the previous machines above referred to are objectionable also, because they require the expenditure of too great an amount of power for economical operation.

As will be seen from the ensuing description, our present invention avoids all of the above defects and provides a machine which operates rapidly and continuously to completely dislodge and remove the weevil and dust, and which permits the separated material to be quickly removed from the machine and destroyed.

To the above purposes our invention consists in certain peculiar and novel features of construction and combinations of parts, as hereinafter described and claimed.

In order that our invention may be fully understood, we will proceed to describe it with reference to the accompanying drawings, in which—

Figure 2:
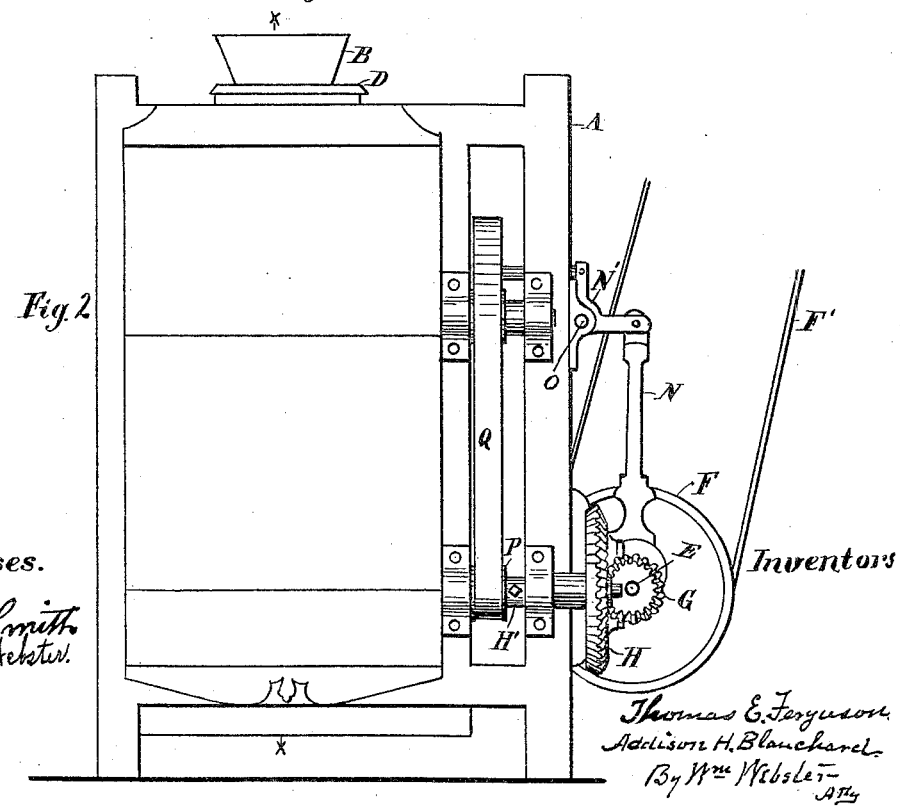
Figure 3:
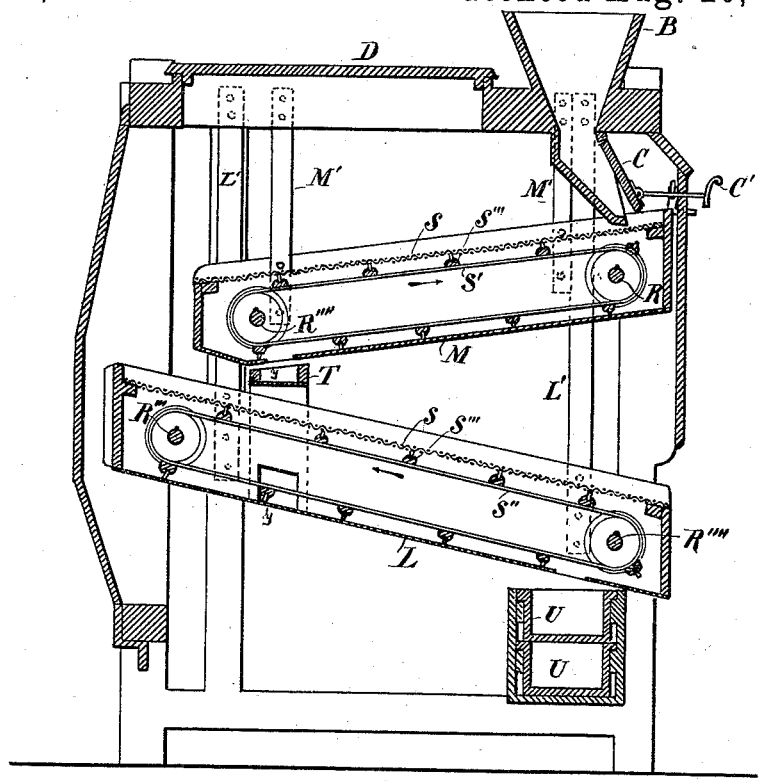
Figure 4:
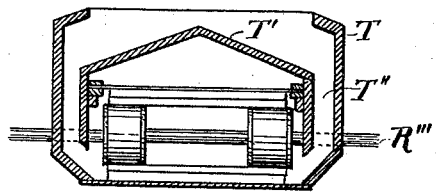
Figure 5:
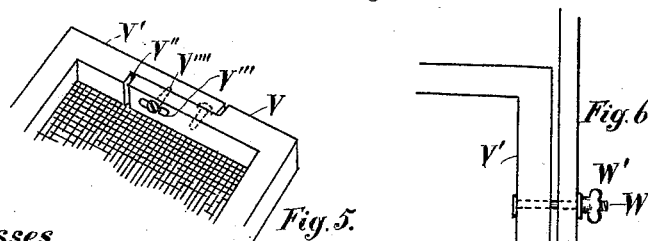
Figure 6:
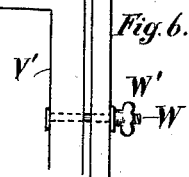
Figure 7:
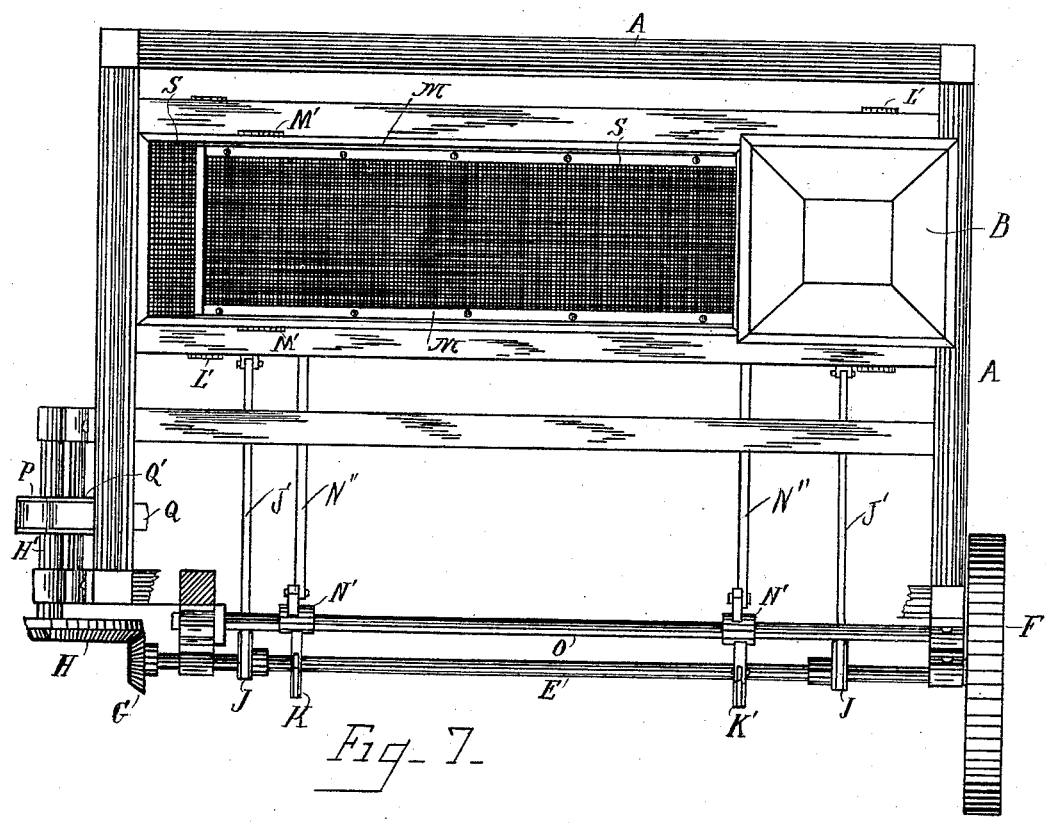

Figure 1 is a front elevation of a machine constructed in accordance with our invention. Fig. 2 is an end elevation of the same. Fig. 3 is a vertical longitudinal section of the same. Fig. 4 is a sectional view on the line $y$ $y$ of Fig. 3, showing in longitudinal section the intermediate chute for conveying the extraneous matter from the upper to the lower shoe. Fig. 5 is a perspective view of one end of a screen-frame, showing the attachments for stretching the screen-wire. Fig. 6 is a plan view of a portion of a screen-frame and shoe, showing the means for taking up the slack of the screen. Fig. 7 is a plan view of the machine, the top being removed to show the connection of the pitmen with the shoes.

In the said drawings, A designates a rectangular frame constructed of suitable timbers mortised, tenoned, or otherwise suitably joined together to form a strong support for the working parts of the machine, said frame being inclosed within an outer covering or shell, which is preferably removable to permit of convenient access to all of the internal working parts. The top of the casing is provided with a removable door or slide D, and in front of said door is placed a hopper B, the throat of which is provided with a hinged door C, having a rod C' extending out through the frame in convenient position to be grasped by the operator for regulating the flow of grain through the throat.

Journaled in suitable boxes upon the front of the machine is a horizontal power-shaft E, having at one end a belt-pulley F, over which runs a belt F' from any suitable source of power, as preferred. At the opposite end of the main shaft E from the pulley F is mounted a beveled gear-pinion G, which meshes with a beveled gear-wheel H, the latter being mounted upon a short shaft H', mounted horizontally upon one end of the machine-frame at right angles to the main power-shaft E. Between its bearings the shaft H' carries a belt-pulley P, for a purpose hereinafter explained.

Upon shaft E are mounted two eccentrics J J, and between said eccentrics J J are mounted two eccentrics K K, which are set at an angle of ninety degrees to the outer eccentrics J. The eccentrics J are connected by pitmen J' with one side of a chute or shoe L, as shown in Fig. 7, said chute being suspended in inclined position within the frame A by flexible hangers L', as shown. An upper chute M is suspended above the chute L by flexible hangers M', so as to incline oppositely to said chute L, before referred to, the lower chute being narrower than the upper one M, and one side of said chute M is connected by suitable links N'' with the upper ends of bell-crank levers N', which are mounted upon a rock-shaft O. This shaft O is journaled horizontally upon the front of frame A above the main shaft E, and the lower ends of its bell-cranks N' are connected by pitmen N with the inner eccentrics K of said power-shaft. This arrangement of connections is such, as will be readily understood, as to vibrate the chutes L and M laterally in opposite directions, or so that when one shoe is at the end of its throw in one direction the other shoe is at the end of its throw in the opposite direction, thus equalizing the movements of the chutes, relieving the working parts of undue strain, and avoiding to a great extent all jar upon the frame, and also reducing the amount of power required to vibrate the said chutes.

The upper sides of chutes L and M are covered by screens S, and beneath the screens of the said chutes are placed endless belts S' S'', one belt being within each chute. The upper belt S' runs over pulleys upon shafts R R'''', which extend through the upper and lower ends of said chutes, respectively, similar to the shafts R R'''' before referred to. Upon each belt S' S'' are secured transverse slats or scrapers S''', which move in contact with the under sides of the screens, and remove all dust and extraneous matter that may collect in the meshes of the same.

It will be observed that as the chutes L M are vibrated laterally, as above described, the pulleys which carry aprons S' S'' will be caused to play longitudinally upon the shafts R R'''' and R''' R''''', so as to compensate for the movements of the screens. The aprons S' S'' are actuated by means of a belt Q, which runs from pulley P on shaft H' over an idler Q' on frame A above said pulley, and from thence to a pulley Q'', which is mounted upon the front end of the horizontal shaft R, said shaft being journaled in the opposite end of the frame A to that occupied by the shaft H', and extending through the upper end of chute M, as before referred to. From pulley Q'' the belt Q runs over a pulley R'' upon the horizontal shaft R''', which extends through the upper end of chute L, as before described, and which is journaled in bearings upon the lower part of frame A, at the same end of said frame as shaft H' and parallel thereto. It will be seen that by this arrangement of belt Q the endless belts or aprons S' S'' are caused to travel in opposite directions and toward the upper ends of the chutes L and M.

T designates a chute which extends transversely of the frame A, and which connects the upper and lower chutes or shoes L and M. (See Fig. 3.) The lower end of the upper chute M feeds into the upper part of the intermediate chute T, and the upper part of the lower chute L works through said intermediate chute, as is best shown in Fig. 4, the interior of said intermediate chute being provided with a double inclined deflector T', which spans the apron S'' of the lower chute and communicates with vertical ways T'' at opposite ends of the deflector, so as to lead the material to the bottom of said lower chute.

The operation of the above-described mechanism is as follows: Power being applied to pulley F through the band F', shaft E is revolved, and through the eccentrics J K, their pitmen, the rock-shaft O, and its links, the chutes L and M are vibrated laterally in opposite directions, as before described. Meanwhile power is communicated through pinion G to gear-wheel H to pulley P, and from the latter through belt Q to the shafts R R''', and the endless belts S' S'' are revolved in the direction of the inclination of the chutes. Grain is now admitted through hopper B, the amount being regulated by the hinged door C. From the throat of the hopper the grain falls upon the screen S of the upper chute M, which is being rapidly vibrated, and passes down through the lower end of the same. The weevil and weevil-dust are dislodged from the interior of the kernels by the impact of the grain in passing along the screen and fall upon the endless belt S', the scrapers S''' insuring the complete removal of the weevil and dust from the screen, and are carried by said belt around to the base of the chute M and discharged into the intermediate chute T. The weevil falls upon the deflector T' and passes through the ways T'' at each end of the intermediate chute T, and is carried into the bottom of chute L. The grain from the screen of upper chute M falls upon the upper end of the screen of the lower chute L, and is thereon agitated, so as to bring further impact upon the grain, and the material thus finally separated falls upon the lower belt S'', by which it is carried upward and then swept downward with the material from the intermediate chute T into the draws or boxes U, the grain from the lower screen S being discharged from the lower end thereof out of the machine, and is received into suitable receptacles or otherwise, as desired.

In order to prevent the screens of the upper and lower chutes from sagging under the weight of grain passing over them, the frames of the screens are each formed in two parts, which are connected together, preferably, at the center of each end. V V', in Fig. 5, designate the two parts of one of these screen-frames, each part being reduced for a portion of its length, so as to lie against the reduced portion of the other part, as shown at V''. The reduced part V is formed with an elongated slot V''', through which is passed a bolt V'''', which takes into the opposite part V', thereby permitting any desired lateral extension of the screen-frame. In order to strain the screen, it is only necessary to loosen the bolts V'''', separate the parts as required, and then tighten up the bolt so as to hold the parts in the required position and remove the sag.

In Fig. 6 we have shown a preferred arrangement for regulating the tension, in which a bolt W, having a nut W', is passed through the side of the chute L or M, and also through the side V' of the screen-frame. If desired, there may be two bolts employed, one on each side of the chute, or one side of the screen may be secured to the chute. In either case, when it is desired to take up the slack of the screen, the nut W' is turned upon the bolt until the desired tension is brought upon the screen.

From the above description it will be seen that we have produced a simple and durable form of machine, which is continuous and rapid in its operation, and which thoroughly removes the weevil and weevil-dust from the grain and deposits such material in a separate receptacle, so that it may be readily removed from the machine and entirely destroyed.

Having thus described our invention, what we claim as new therein, and desire to secure by Letters Patent, is—

1. In the herein-described mechanism for operating two independently-reciprocating shoes, the combination, with a horizontal driving-shaft carrying a pulley at one end, of the angularly-arranged eccentrics secured to the shaft, a rock-shaft in parallel relation with the driving-shaft, bell-crank levers secured thereto, pitmen connecting two of the eccentrics, and bell-crank levers, and the link-arms and pitman connecting the shoes and operating mechanism, substantially as shown and described.

2. In a machine for separating weevil and weevil-dust from grain, the combination, with an inclined shoe provided with a screen and carrying an endless scraper-belt beneath the screen, of a horizontal power-shaft having eccentrics arranged thereon, a horizontal rock-shaft located above the power-shaft and carrying bell-crank levers, pitmen connecting the eccentrics and bell-crank levers, link-arms connecting the shoe and said levers, gear-wheels G, arranged upon one end of the power-shaft adapted to mesh with a second gear H, the pulleys P and Q'', mounted as described, and the belt for operating them, all arranged and adapted to operate substantially as shown and described.

3. The herein-described mechanism for supporting and operating two independently-reciprocating shoes and the endless scraper-belts carried within them, consisting of the horizontal power-shaft having a pulley at one end and a gear-wheel at the other, two pairs of angularly-arranged eccentrics secured to the shaft, a horizontal rock-shaft located above the power-shaft, and having bell-crank levers secured thereon, pitmen N, connecting one pair of eccentrics with the bell-crank levers, link-arms N'', connected to the crank-levers, the pitmen J', connected to the second pair of eccentrics, a gear-wheel mounted upon a transverse shaft H' and meshing with the gear upon the power-shaft, the pulleys P, Q'', and R'', mounted, respectively, upon the shafts H', R, and R''', the belt Q, and the idler Q', all arranged and adapted to operate substantially as shown and described.

4. A machine for separating weevil and weevil-dust from grain, consisting of the pair of oppositely-inclined chutes, each provided with a screen, and the endless scraper-belts mounted within said chutes, the horizontal power-shaft with its beveled pinion and its eccentrics arranged in two differential pairs, the horizontal rock-shaft having the pair of bell-crank levers, the pitmen connecting one pair of eccentrics to the lower scraper and the other pair of eccentrics to end of the levers, and the links connecting the other ends of said levers to the upper chute, the transverse shaft, with its beveled wheel and belt-pulley, and the belt extending from said belt-pulley to belt-wheels upon the upper shafts of the belts in the two chutes, substantially as and for the purpose specified.

In testimony that we claim the foregoing as our own we hereby affix our signatures in presence of two witnesses.

THOMAS EASTON FERGUSON.
ADDISON HENRY BLANCHARD.

Witnesses:
THOS. EDWARD WALLACE,
FREDK. B. DODGE.